Nov. 16, 1954     H. W. LAWSON     2,694,423
INSERTED SAW TOOTH
Filed Nov. 8, 1950
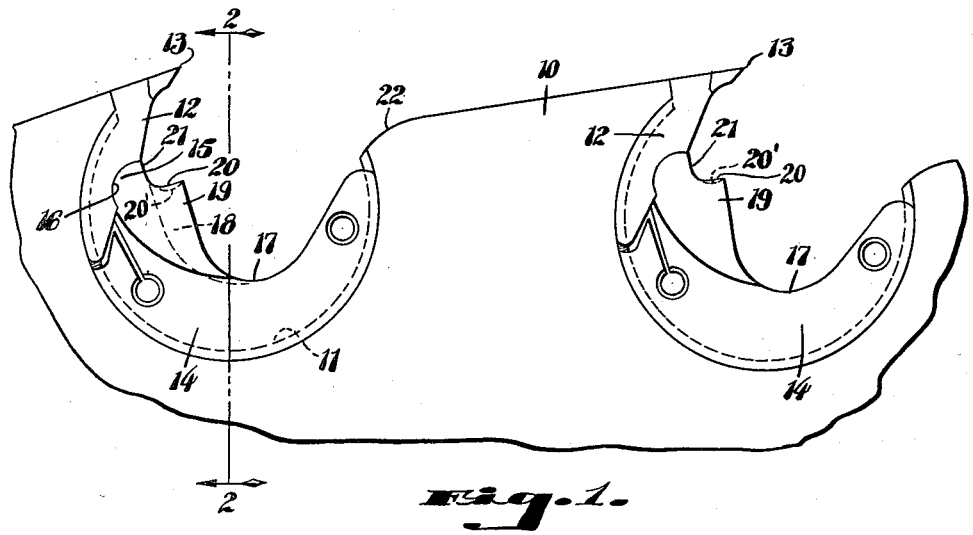
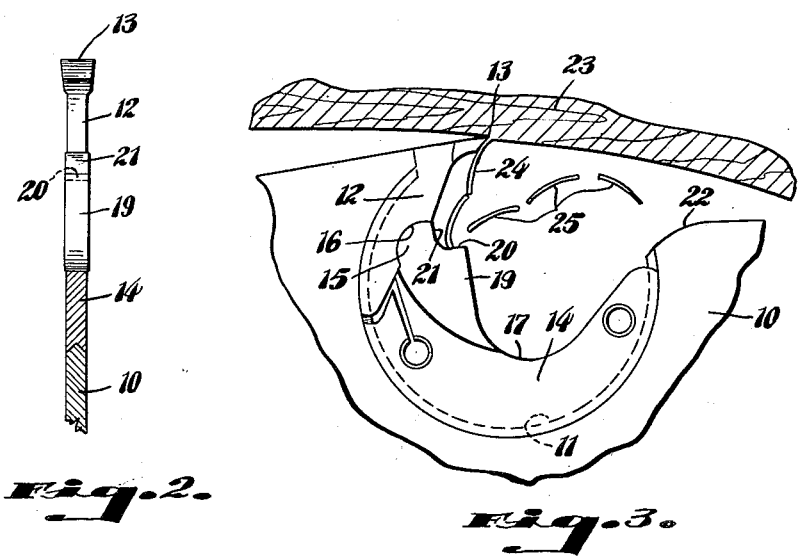
INVENTOR.
HENRY W. LAWSON,
BY: Harold B. Hood
ATTORNEY.

Patented Nov. 16, 1954

2,694,423

INSERTED SAW TOOTH

Henry W. Lawson, Indianapolis, Ind., assignor, by mesne assignments, to Borg-Warner Corporation, Chicago, Ill., a corporation of Illinois Application November 8, 1950, Serial No. 194,593

9 Claims. (Cl. 143—151)

The present invention relates to a holder for a saw tooth of the inserted tooth type, and more particularly to an improved form of holder which, being provided with a chip-breaking projection or abutment surface, will act, during operation of a saw in which it is assembled, to break or disintegrate the chip of wood or similar material being cut by its associated tooth, and to discharge the broken chip pieces forwardly, in the direction of rotation of the saw, thereby preventing an accumulation of cut material in the tooth gullet. The primary object of the invention, then, is to provide an improved holder so proportioned and designed as to act, during saw operation, in the manner aforesaid.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmental elevation showing a portion of a circular saw blade fitted with removable teeth retained in place by holders constructed in accordance with the present invention;

Fig. 2 is a fragmental section taken substantially on the line 2, 2 of Fig. 1; and Fig. 3 is a view similar to Fig. 1, showing the saw in operation and diagrammatically illustrating the manner in which the holder abutment surface acts upon the chip being cut by its associated tooth.

Referring more particularly to the drawings, I have indicated at 10 a portion of the peripheral region of a circular saw formed to provide peripherally-spaced sockets 11, each having a generally radially-opening mouth. A removable tooth 12, of a character well and familiarly known in the art to which the present invention pertains, is adapted to be received in the trailing portion of each socket 11, each tooth being formed with a cutting tip 13 disposed in the active periphery of the saw.

Each tooth is retained in this position by a holder 14 seating in the socket 11 and provided with a finger 15 which, when the parts are assembled, finds a seat in a suitably formed notch or socket 16 in the forward face of the shank of the tooth 12. Each holder 14 is formed to provide a gullet 17, generally in advance of the tooth; and it has been established practice, over many years, for the gullet 17 to be smoothly curved both on its forward side, as illustrated, and on its trailing side, as suggested by the dotted line 18 in the left-hand portion of Fig. 1.

Though the art has long used inserted teeth and holders generally of the type here under consideration, and though substantial difficulty has been experienced by reason of accumulation of cut material in the gullet 17, no effective solution for that difficulty has heretofore been proposed. Accumulation of chips and shavings in the gullet 17, of course, produces a clogging action upon operation of the saw and results in heating at the rim of the saw. Such heating, when carried to excessive lengths, destroys the saw tension, and frequently causes the saw to "snake" in its kerf. Having no other means of egress, the cut material will sometimes force its way between the saw faces and the opposite walls of the kerf. Such conditions, of course, result in uneven cuts and rough surfaces on the cut material or uneven thicknesses of lumber being produced.

I have found that, by forming the holder 14 to provide a forwardly-extending projection 19 defining a generally outwardly-facing abutment surface 20 backed by a generally forwardly-facing surface 21, I can obviate these operational disadvantages. Preferably, I so form the projection 19 that its surface 20 is substantially perpendicular to the backing surface 21 which, in turn, is disposed substantially upon a radius of the saw blade 10. In the preferred form of the invention, the abutment surface 20 is a plane, a forward extension of which clears the leading side 22 of the mouth of the socket 11. I presently believe that the surface 20 may be concavely curved without substantially deleteriously affecting the action thereof, and experience indicates that that surface will usually wear to such a curved condition, as indicated in dotted lines at 20' in Fig. 1; but at any rate, an extension of such surface should clear the leading side 22 of the socket mouth.

I presently believe that the surface 20 should terminate short of a radius including the tip 13 of the tooth 12.

In action, the tooth tip 13 will slice material from the work 23 in the form of a chip 24 which, as it flows into the gullet 17, will encounter the abutment surface 20, thereby being broken into short sections, as suggested at 25 in Fig. 3. The backing surface 21 will strike these fragments, as the saw rotates, before the fragments can find their way deeply into the gullet 17, to propel the fragments forwardly, in the direction of rotation of the saw, and to drive them out of the kerf ahead of the surface 21.

As a consequence of this action, cut material cannot accumulate in the gullet 17, so that the clogging, heating, and consequent "snaking" above described are completely obviated.

I claim as my invention:

1. A holder for an inserted saw tooth, said holder being formed to provide an abrupt arcuate abutment surface projecting into the gullet region, said abutment surface being disposed radially inwardly and to the rear of the point of a tooth held by said holder, with reference to the direction of rotation of a saw in which said tooth and holder are assembled and said surface further being substantially perpendicular to a radius of such saw touching the rearmost end of said surface.

2. In an inserted tooth saw having a socket having a generally radially opening mouth, a tooth and a holder therefor in said socket, said holder being formed to provide a gullet interrupted by a single abutment surface projecting forwardly, relative to the intended direction of rotation of the saw, from a forwardly-facing exposed surface of such gullet, said abutment surface being disposed in a plane clearing the leading side of said mouth and merging, at its rearward end, with said forwardly-facing exposed surface, in an arcuate surface of substantially 90° length.

3. In an inserted tooth saw, a replaceable tooth element, and a locking holder element, one of said elements being formed to provide an abrupt arcuate abutment surface projecting into the gullet region, said abutment surface being disposed radially inwardly and to the rear of the point of a tooth held by said holder, with reference to the direction of rotation of a saw in which said tooth and holder are assembled, a portion of said surface being substantially perpendicular to a radius of such saw touching said surface portion.

4. In an inserted tooth saw, a replaceable tooth element having a cutting edge, and a locking holder element, said elements defining a gullet surface interrupted between its ends by a single abrupt abutment surface projecting forwardly from said gullet surface and disposed radially inwardly of said cutting edge, said abutment surface facing generally outwardly of the saw and merging with a radially outer portion of said gullet surface in a smooth curve.

5. Structure adapted to be inserted into a peripheral opening formed in a rotatable saw comprising a tooth element and a locking holder element, said holder element including means defining a gullet surface having a curved chip-breaker portion facing generally forwardly with respect to the rotation of the saw and a chip-deflecting portion facing generally outwardly of the saw, said chip-breaker portion being adapted to break up chips after they are cut by the tooth element and said chip-deflecting portion being adapted to thereafter deflect the broken chips out of the peripheral opening in the direction of rotation of the saw.

6. Structure adapted to be inserted into a peripheral opening formed in a rotatable saw comprising a tooth element and locking holder element, one of said elements having a forwardly facing projection defined by two intersecting surfaces, one of said intersecting surfaces being disposed radially outwardly with respect to the other and having a curved chip breaker portion facing generally in the direction of rotation of the saw and a chip deflecting portion facing generally outwardly of the saw, said chip breaker portion being adapted to break up chips after they are cut by the tooth element and said chip deflecting portion being adapted to thereafter deflect the broken chips out of the peripheral opening in the direction of rotation of the saw.

7. Structure adapted to be inserted into a peripheral opening formed in a rotatable saw comprising a tooth element and a holder element, said tooth element being formed with a cutting edge at its radially outermost point, one of said elements having a forwardly directed projection disposed to the rear of said cutting edge with reference to the direction of the rotation of the saw, said projection having a curved chip-breaker portion facing generally in the direction of rotation of the saw and disposed between a radially outer portion and a radially inner generally flat chip-deflecting portion, said chip-deflecting portion facing generally outwardly of the saw, said chip-breaker portion being adapted to break up chips after they are cut by the cutting edge and said chip-deflecting portion being adapted to thereafter deflect the broken chips out of the peripheral opening in direction of rotation of the saw.

8. In an inserted tooth saw having a socket having a generally radially opening mouth, a tooth and a holder therefor in said socket, said holder being formed to provide a gullet interrupted by an abutment surface projecting forwardly, relative to the intended direction of rotation of the saw, from a forwardly-facing exposed surface of such gullet, said abutment surface being disposed in a plane clearing the leading side of said mouth, and said abutment surface further being backed by a generally outwardly-extending surface substantially perpendicular to said abutment surface and merging with a forwardly-exposed surface of the associated tooth in an angle approximating 180°, said abutment surface merging with said generally outwardly-extending surface in a smooth curve.

9. In an inserted tooth saw having a socket having a generally radially opening mouth, a tooth and holder therefor in said socket, said holder being formed to provide a gullet interrupted by an abutment surface projecting forwardly, relative to the intended direction of rotation of the saw, from a forwardly-facing exposed surface of such gullet, and spaced substantially inwardly from the juncture of said forwardly-facing exposed surface with said tooth, the included angle between said abutment surface and said forwardly-facing exposed surface being substantially 90°, and said abutment surface merging with said forwardly-facing exposed surface in a smooth curve.

References Cited in the file of this patent

UNITED STATES PATENTS

| Number | Name | Date |
|---|---|---|
| 780,606 | Fox | Jan. 24, 1905 |
| 1,687,448 | Hildreth | Oct. 9, 1928 |